J. S. JOHNSON.
QUACK GRASS DESTROYING MACHINE.
APPLICATION FILED SEPT. 20, 1910.
1,002,276.
Patented Sept. 5, 1911.
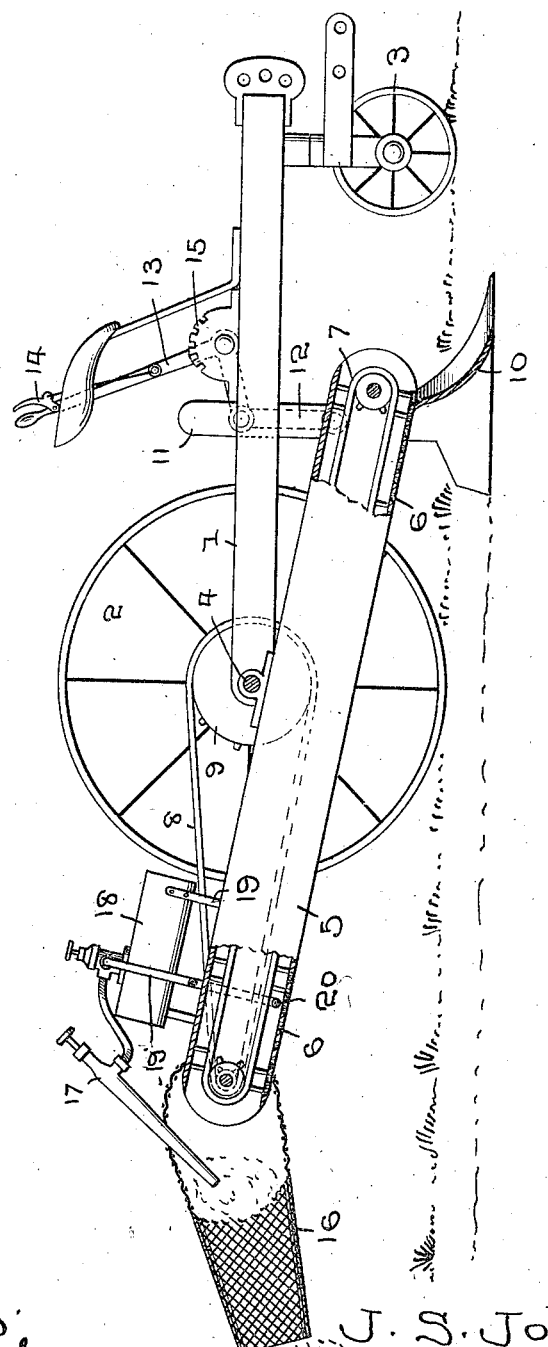
WITNESSES:
INVENTOR
J. S. Johnson
BY
W. J. Fitzgerald & Co.
Attorneys

UNITED STATES PATENT OFFICE.

JOHN S. JOHNSON, OF WAUKON, IOWA.

QUACK-GRASS-DESTROYING MACHINE.

1,002,276.  Specification of Letters Patent.  Patented Sept. 5, 1911.

Application filed September 20, 1910. Serial No. 582,905.

*To all whom it may concern:*

Be it known that I, JOHN S. JOHNSON, a citizen of the United States, residing at Waukon, in the county of Allamakee and State of Iowa, have invented certain new and useful Improvements in Quack-Grass-Destroying Machines; and I do hereby declare the following to be a full, clear, and exact description of the invention, such as will enable others skilled in the art to which it appertains to make and use the same.

This invention relates to certain new and useful improvements in quack grass destroying machines, the object being to provide a machine which is so constructed that the grass will be removed by a plow and carried through a perforated casing by an elevator where the soil will be removed therefrom, and the grass deposited into a reticulated casing, in which are arranged oil burners for burning the same before it is discharged on to the soil.

A still further object of my invention is to provide a machine which is exceedingly simple and cheap in construction and one which is so constructed that the plow can be readily raised or lowered in order to remove a thick or a thin sod in order to meet different requirements.

Another object of my invention is to provide novel means for driving the elevator within the sifting casing, whereby the sod removed by the plow will be broken up and the soil removed therefrom in traveling through the same.

In the drawing, I have shown a side elevation of my improved machine partly in section, in which—

1 indicates a wheeled frame supported by rear wheels 2 and front wheels 3, the rear wheels 2 being mounted on an axle 4, on which is pivotally mounted a sifting casing 5 which is provided with a perforated bottom 6 and in which is mounted an endless elevator 7 which is driven by a chain 8 carried by a sprocket 9 mounted on the axle 4, and when the machine is drawn forwardly, the elevator will be operated in order to carry the sod deposited therein through the same as will be later described. The forward end of the casing carries a plow 10 which is provided with a suitable standard 11 mounted in suitable bearings formed in the frame 1 so as to hold the same firmly and relieve the strain from the casing. Connected to the casing is a link 12 which is connected to the arm of the crank lever 13 mounted on the frame which is provided with a latch 14 co-acting with a segmental rack 15 secured on the frame in such a manner that the plow and casing can be adjusted vertically and locked in their adjusted positions.

Extending downwardly from the rear end of the casing 5 is a reticulated conical casing 16 adapted to receive the grass from the casing 5. Arranged within this casing are a plurality of oil burners 17 for burning the grass as it passes through the same, and it will be seen that the grass will be thoroughly destroyed before it is dropped upon the ground. The burners 17 are connected to a suitable supply tank 18 which is mounted on a suitable support 19 arranged upon the casing 5, as clearly shown, and said tank may be provided with a pump which is driven by a suitable belt and pulley operated by the axle of the frame. Extending from the tank 18 are pipes 19' carrying burners 20 which extend into the casing 5, so that grass will be partly burned within the casing 5 before it reaches the casing 16. The tank is provided with a suitable filling cap which can be removed in order to fill the same, and it will be seen that the same is supported in such a position that the fuel will be fed to the burners by gravity.

From the foregoing description, it will be seen that as the frame is drawn along, the plow will remove the sod and deposit the same into the casing 5, through which it is carried by the endless elevator 7 which breaks the same up and removes the dirt therefrom, which drops through the perforated bottom back on to the surface over which the machine is traveling. The grass is discharged from the upper end of the casing 5 into the reticulated casing 16 in which it is destroyed by the burners 17, and is then discharged therefrom back on to the ground which will enrich the ground as well as destroy the grass.

The burners 17 are adapted to project strong blast flames toward the outlet of the reticulated casing 16 and these flames produce a rapid inflow of fresh air through the wall of said casing, and thereby assist in distributing the grass from the elevator 7 in small particles, so that the flames will act upon the grass and its roots, and the discharge of the products of combustion will be greatly facilitated. The air currents that are created in the casing 16 serve to distribute products of combustion, particularly the ash of the grass, over a wide area of ground, so that they can be readily incorporated in the ground surface.

What I claim is:—

1. A grass destroying machine, comprising a wheeled frame having a plow, a casing provided with an endless elevator adapted to receive the sod from the plow, and a reticulated casing arranged at the upper end of said casing provided with burners.

2. A grass destroying machine, comprising a wheeled frame having a pivotally mounted casing, a plow carried by said casing, means for adjusting said plow and casing, said casing being provided with a perforated bottom, an endless elevator arranged in said casing, and a reticulated casing carried by the upper end of said casing having burners extending therein.

3. A machine for destroying grass, comprising a wheeled frame, a casing pivotally supported by the rear axle of the frame, a plow carried by the forward end of said frame, a lever for actuating said casing and plow, an endless elevator mounted in said casing, a sprocket wheel carried by the axle carrying a chain for driving said endless elevator, and a reticulated discharge casing arranged at the upper end of said casing having burners.

4. A machine for destroying grass, comprising a wheeled frame, a casing pivotally supported by said frame having a perforated bottom, a plow carried by the forward end of said casing, means for raising and lowering said plow and casing, an endless elevator mounted in said casing, means for operating said endless elevator, a reticulated conical discharge casing extending downwardly from the rear of said casing, and burners extending into said discharge casing.

5. In a grass destroyer, a frame, grass removing and elevating means carried thereby, a reticulated casing carried by said means and provided with an outlet and a burner projecting into the casing.

6. In a grass destroyer, a frame, grass removing and elevating means carried thereby, a reticulated casing having a discharge end and carried by said elevating means and arranged to receive grass therefrom, and a burner projecting into the casing and toward the discharge end thereof.

In testimony whereof I have signed my name to this specification in the presence of two subscribing witnesses.

JOHN S. JOHNSON.

Witnesses:
W. A. EARLE,
R. C. SMITH.